United States Patent

Cahill

[15] 3,675,706
[45] July 11, 1972

[54] TIRE BUFFING MACHINE

[72] Inventor: William S. Cahill, Danville, Va.

[73] Assignee: Cahill Manufacturing Company, Inc., Danville, Va.

[22] Filed: April 14, 1971

[21] Appl. No.: 133,862

[52] U.S. Cl. .................................................. 157/13
[51] Int. Cl. .................................................. B29h 21/08
[58] Field of Search ................................. 157/13

[56] References Cited

UNITED STATES PATENTS

| | | | |
|---|---|---|---|
| 2,864,445 | 12/1958 | Hawkinson | 157/13 |
| 2,965,162 | 12/1960 | Hawkinson | 157/13 |
| 3,528,476 | 9/1970 | Hawkinson, Jr. | 157/13 |
| 3,584,673 | 6/1971 | Lehman | 157/13 |

*Primary Examiner*—Granville Y. Custer, Jr.
*Attorney*—Christen & Sabol

[57] ABSTRACT

A machine for buffing a tire of any desired size and width includes a tire support mounted on a base for oscillation around an axis perpendicular to the base and for sliding movement in a plane parallel to the base. A cutting means is mounted on the base for sliding movement in a plane parallel to the base towards the tire. A template with a one to one ratio with respect to the desired tire contour is mounted on the tire support to oscillate therewith, and a template follower connected to the cutting means for movement therewith is urged into contact with the template.

15 Claims, 11 Drawing Figures

TIRE BUFFING MACHINE

The present invention relates to the art of retreading tires, and more particularly to a tire buffing machine used to prepare the exterior surface of a used tire casing for a recapping operation.

It is known that buffing involves roughening the surface of a worn tire so that a later applied strip of rubber known as camelback will adhere and provide the proper tire casing contour. Thereafter, the tire casing is vulcanized to integrate the camelback with the casing and to form a tread design. However, the buffing operation is not only necessary to provide this roughening, but also to conform the tire to given specifications which are usually furnished by the mold manufacturers. A tire buffed to any specifications other than the prescribed ones is subject to failure in the finished product.

In the past, the buffing operation was mainly dependent upon the skill of the operator. However, this had the drawback that the specifications of the mold manufacturers could only approximately be accomplished. Therefore, efforts have been made to automatize this buffing operation.

Heretofore several buffing machines have been developed in attempts to suit the above cited requirements of a buffing operation.

For example, U.S. Pat. No. 2,786,526 shows a machine having a fixedly mounted rasp wheel in combination with a tire support mounted on an articulated arm which is oscillating around a fix pivot point. While tires of any size and width can be processed on this machine, the final shape of the buffed tire greatly depends upon the skill of the operator, and exact reproductions of buffed tires are practically impossible.

U.S. Pat. No. 2,888,065 shows a machine for buffing tires which comprises a support which is fixedly mounted on a base to hold and rotate a tire. A rasp wheel is mounted on a second support for oscillation around the tire and is slidable on said second support. In addition, a fix cam is mounted on the base to guide the movements of the disc rasp. This cam can be used for different tire widths when determined adjustments are carried out on the machine requiring a skilled operator. On the other hand, a cam exchange for different buffing operations is possible, but is very complicated and time wasting due to the facts that the cam follower is constantly urged against the cam and that additional tools are required to free and exchange the cam. Further, the multiple movable bearing parts of the disc rasp support and the rasping direction normal to of rasp direction of rotation of the tire, at the contact point rasp and tire, increase the tendency of the rasp and of the tire to produce vibrations which result in an inaccurate and uneven buffing of the tire casing.

U.S. Pat. No. 2,979,123 shows a tire buffing machine which comprises an oscillating and sliding support for the rasp, a fix tire support and a vertically sliding cam or template. While an automatic buffing operation is possible, this machine has the disadvantage that only one template is used, which limits the shaping possibilities. In addition, the use of the machine is limited to a very narrow range of tire diameters. Further, the same considerations with respect to the vibrations of the tire, as said above, apply in this case, due to the fact that the circumferential directions of the rasp and of the tire are normal to each other.

U.S. Pat. No. 3,117,047 shows a buffing machine which comprises a slidable rasp support and an oscillating tire support. While tires of all sizes and widths can be processed on this machine, the final shape of the buffed tire completely depends upon the skill of the operator, so that exact reproductions of the tires are practically impossible.

U.S. Pat. No. 3,162,233 shows a buffing machine which comprises a sliding rasp support, a sliding tire support and an exchangeable template fixedly mounted on said rasp support. The two sliding directions are normal to each other. The buffing action is basically limited to the crown region of the tire and does not permit buffing of much of the sidewall portions of the tire. In addition, the already mentioned vibrations are also likely to occur in this case due to the moment arms and unbalance inherent in the arrangement disclosed.

U.S. Pat. No. 3,354,929 discloses a tire truing machine which requires a number of complex adjustments in order to adapt it for processing different types of tires and is so constructed as to present chatter and vibrational problems. Moreover, the machine cannot be readily adapted for processing the side-walls of the tire.

From the aforesaid it appears that several designs of buffing machines have been proposed in the prior art. However, all of them have some basic drawbacks and disadvantages with respect to their use in buffing operations.

Therefore, it is an object of the present invention to provide a machine for buffing tires which suits the requirements of a buffing operation and which is exempt of the drawbacks mentioned above.

More particularly, it is an object of the invention to provide a buffing machine which is suitable for accurately processing tires of all sizes and widths.

It is a further object of the invention to provide a buffing machine which is suitable to buff both the crown region of a tire and substantial portions or all of the sidewall portions of the tire to precise specifications issued by mold manufacturers.

It is another object of the present invention to provide a buffing machine which is suitable to obtain any desired and predetermined shape of a tire contour.

It is another object of the invention to provide a buffing machine which is suitable to accurately reproduce any predetermined shape of a tire contour.

Another object of this invention is the provision of a buffing machine which is simple and easy to operate by the individual operator in the field and which minimizes the number of different machine settings necessary and concentrates the controls and machine settings at one location on the machine.

Another object is the provision of a buffing machine characterized by more positive coaction of the various cooperating parts of the machine to result in less machine chatter or vibration and more accurate and reproducible buffing action.

It is another object of the invention to provide a buffing machine which is easy to operate and which requires little skill from the operator.

It is a further object of the invention to provide a buffing machine which not only is time saving during the buffing operation, but particularly also during the steps by way of machine settings to be performed between successive buffing operations.

It is still another object of the invention to provide a buffing machine which reduces the vibrations of the cutting means and the tire to a minimum, thus improving the results of the buffing operation.

To realize these objects, a machine for buffing a tire, according to the present invention, basically comprises a tire support means mounted on a base to oscillate around an axis substantially perpendicular to the base, and provided with a carriage slidably mounted on it for movement in a plane substantially parallel to the base. The carriage is adapted to hold a tire rotating on an axis substantially parallel to the base. A cutting means is mounted on the base for movement in a plane substantially parallel to the base towards the tire. A template means with a profile defining the contour desired for the tire is mounted on the tire support means to oscillate therewith and is adapted to contact with template follower means connected to the cutting means for movement therewith.

Further objects and features of the present invention will be best understood and appreciated from the following description of preferred embodiments of the machine selected for purposes of illustration and shown in the accompanying drawings, in which.

Figure 1:
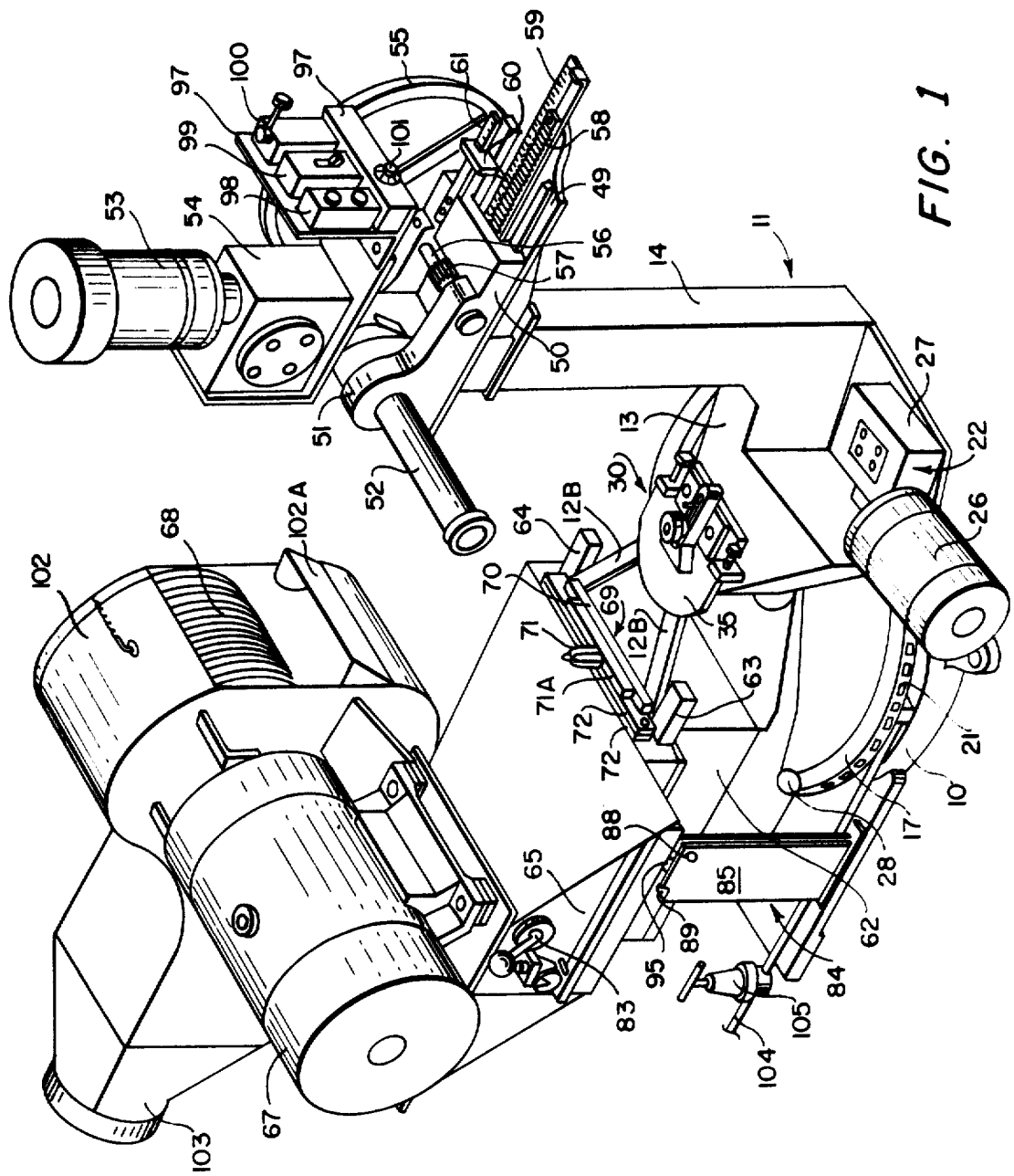
FIG. 1 is a perspective general view of a buffing machine, according to the invention.
Figure 2:
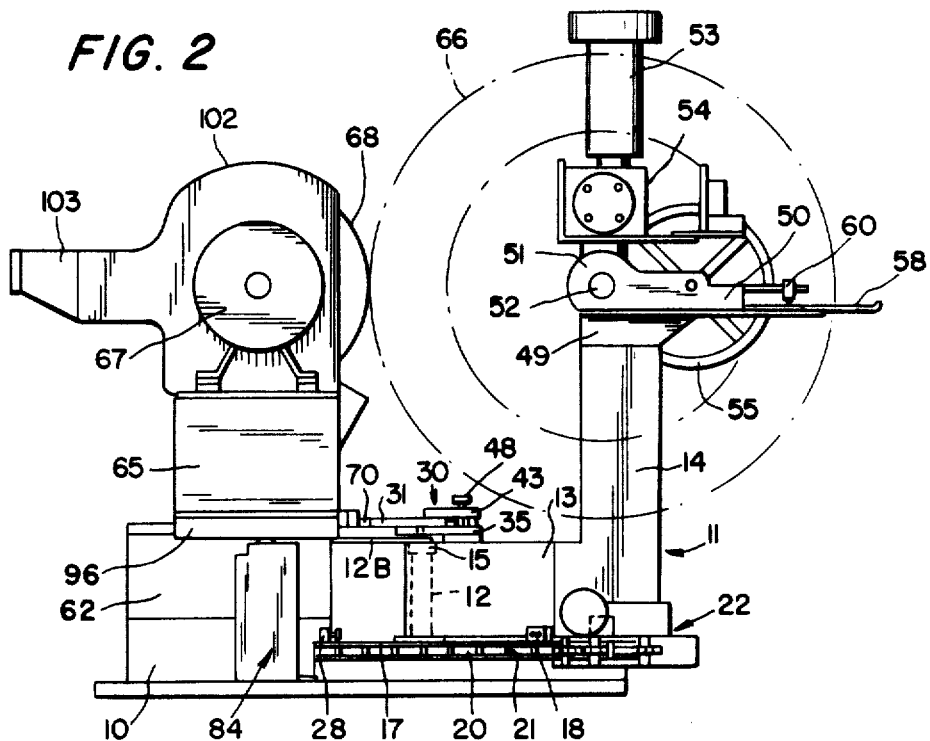
FIG. 2 is a side elevational view of the buffing machine, in operative position and provided with a tire indicated by broken lines.
Figure 3:
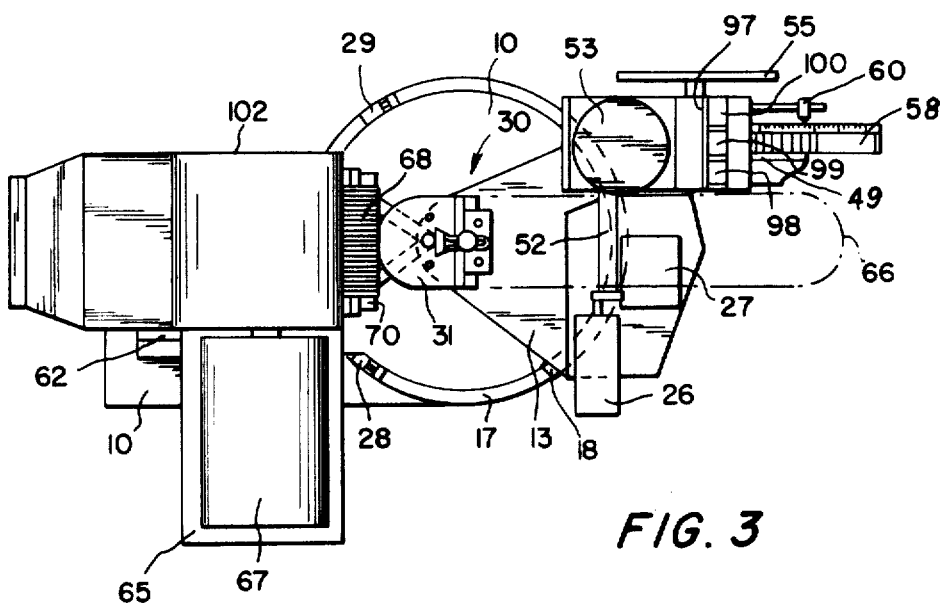
FIG. 3 is a plan view of the machine shown in FIG. 2.

Referring now more particularly to the drawings, FIGS. 1–3 are general views of a machine for buffing a tire embodying the invention. As shown in these figures, the machine includes a base 10 which rests on or is suitably secured to a floor level supporting surface.

Figure 4:
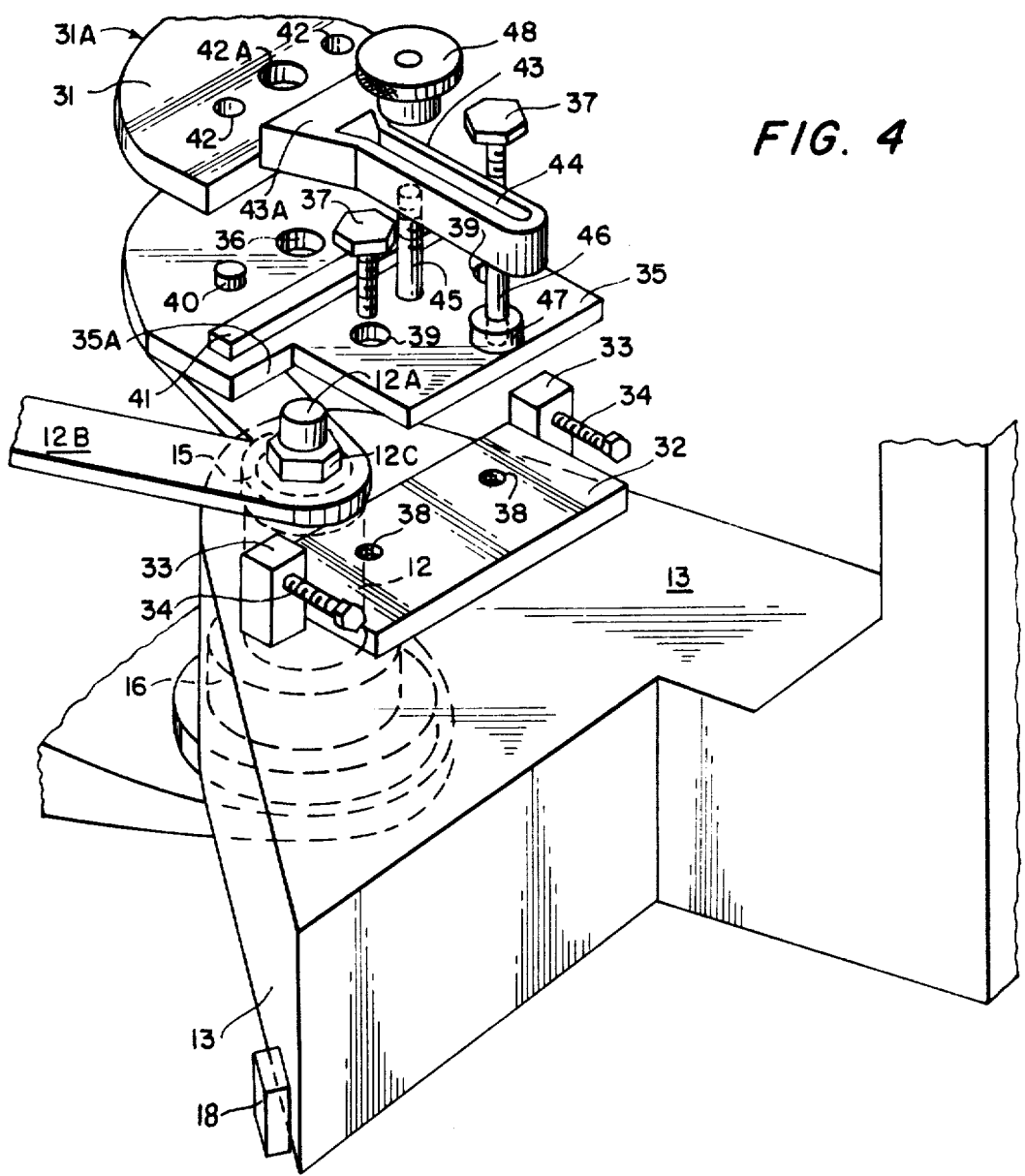
FIG. 4 is an exploded perspective view of the template means.

A tire support means 11 is pivotally mounted on base 10 to oscillate on an axis of oscillation substantially perpendicular to the base and which is the axis of a king pin 12 which is fixed in upright position to base 10. The support means 11 comprises a generally L-shaped structure with an enlarged generally triangular foot portion 13 and an upright member 14. Said foot portion is mounted on the king pin 12 by means of a bearing 15 and a bushing 16 as shown in FIG. 4. The king pin 12 is provided with a king pin center 12A and stabilizer bars 12B which are secured to the king pin center by means of a nut 12C and are fixed to the base 10 by connection to secondary base 62 described hereinafter.

Figure 5:
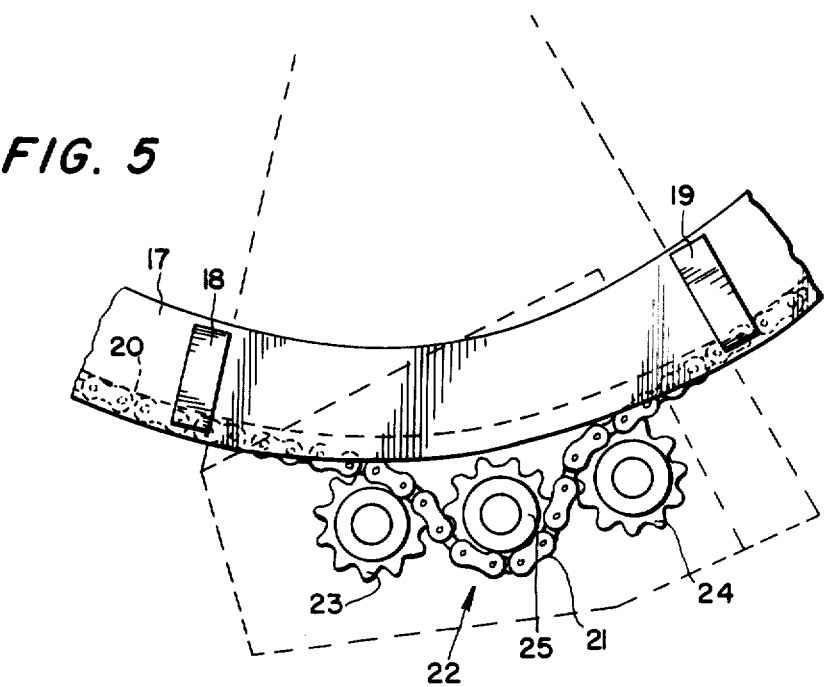
FIG. 5 is a broken plan view of the means for oscillating the tire support means.

A way ring 17 is fixedly mounted on base 10, concentrically with said axis of oscillation of the tire support means 11, and has the purpose to provide a sliding surface for said foot portion 13 during its oscillatory movement. Two stabilizing blocks 18 and 19, better shown in FIG. 5, are adjustably fixed to both sides of foot portion 13 and slide over way ring 17, thus carrying a portion of the total weight of the tire support means 11 and greatly contributing to the stability of said foot portion 13. The stabilizing elements are provided with wiping portions, for example rubber blocks or brushes (not shown), to clean the way ring of buffing dust to provide a smooth sliding.

Said way ring 17 is provided with a peripheral groove 20 adapted to locate a roller chain 21 which is attached at its two ends to said way ring. Said foot portion 13 is provided with a sprocket means 22 comprising a frame mounted on the foot portion. Two idling sprockets 23, 24 and a driven sprocket 25 (better shown in FIG. 5) are rotatably mounted in said frame, and sprocket 25 is driven by a reversible variable speed motor 26 through a gear box 27. The roller chain 21 is conducted around a portion of sprocket 25 and is urged into this position by the pressure exerted by idling sprockets 23 and 24, so that a rotation of sprocket 25 results in a relative movement of the sprocket assembly with respect to the roller chain 21 and the way ring 17 and, therefore, results in an oscillatory movement of the tire support means 11 around pivot 12. Two spaced rubber stops 28 and 29 are mounted on the way ring 17 to limit the oscillatory movement of the support means 11. Alternatively, two adjustable limit switches (not shown) may be mounted on the way ring to automatically reverse the direction of the sprocket motor when the support means 11 reaches a predetermined angle of oscillation.

A template assembly 30 is mounted on said foot portion 13 to oscillate therewith and with the whole tire support means 11. Referring momentarily to FIG. 4, it can be appreciated that said template assembly comprises a template 31 having a profile 31A defining the contour desired for the tire, and carrier means for said template. The carrier means comprises a first plate 32 which is fixedly attached to the foot portion 13, for example by welding, and is laterally provided with two mountings 33 for respective set screws 34 which are screwed into threaded holes passing completely through the mountings. A carrier plate 35 provided with an opening 36 having a slightly larger diameter than the king pin center 12A is mounted around said king pin and is affixed to plate 32 by means of two bolts 37 passing through holes 39 provided in said second plate and screwed into threaded holes 38 provided in first plate 32. It is noted that when in this position the lower surface of plate 35 clears the upper surface of nut 12C. The holes 39 in plate 35 are slightly larger in diameter than the shanks of bolts 37, so that a certain oscillation of plate 35 is possible around said king pin center 12A when the screws 37 are loose, in order to permit an accurate adjustment of plate 35 by turning set screws 34 which abut respective wing portion 35A of plate 35. Plate 35 is also provided with pins 40 and an alignment bar 41. The pins 40 are adapted to engage corresponding recesses 42 in template 31, which is also provided with an opening 42A to be mounted around king pin center 12A. The rear side of template 31 abuts alignment bar 41, to provide an accurate positioning of said template on plate 35.

Figure 4A:
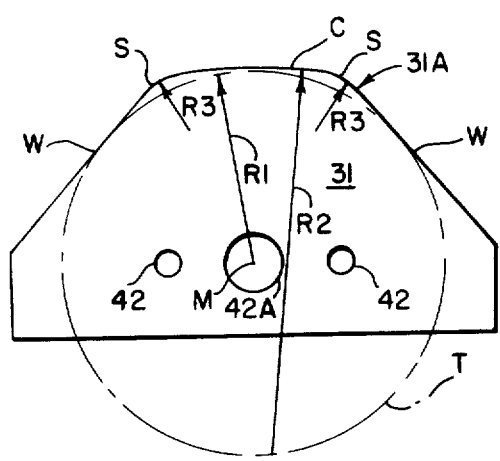
FIG. 4a is a plan view of a particular template.

Template 31, when positioned by the pins 40 and alignment bar 41 on carrier plate 35, oscillates about the axis of the king pin center 12A. This axis pierces the symmetrical center M of the template, as indicated in FIG. 4a. Pneumatic tires normally are built by first constructing a hollow toroid-like body the cross-section of which is circular having a specified diameter, e.g., 8 inches for an 8.00 tire, and onto which the crown and side walls are applied.

The symmetrical center M of the templates used herein coincides with the center of the circular tire cross section T having the radius $R_1$ and the distance from the symmetrical center M to a point on the profile 31A of the template 31 is the same as the distance from the center of the particular tire to be buffed to the corresponding point on the surface of the tire after the desired buffing. The profile 31A of the template 31 includes an arc C corresponding to, and having the same radius $R_2$ as, the crown of the tire contour after the desired buffing, shoulders S of arcuate cross-section having the radius $R_3$ disposed on each side of the crown, and two substantially flat portions W on the outboard sides of the shoulders S. It can thus be seen that the distance from the center M to the profile 31A for a particular template varies along this profile and is equal to one half the diameter of the circular cross-section T, e.g., approximately 4 inches for an 8.00 tire, plus the desires contour, i.e., thicknesses of the crown, shoulders and/or sidewall built on the toroid-like body, of the finished buffed surface of the tire. The profile of the template is the exact duplicate of the buffed contour of the tire to which it corresponds. It can be appreciated, therefore, that, because of the wide variety of different tires having different cross-sectional diameters and side-walls and crowns of different shapes and thicknesses, a variety of templates having exact 1:1 ratios with respect to the tires they represent are required. Moreover, it is understandable that the use of a single template, as heretofore attempted in the prior art, will not provide the exact buffing required if used in the buffing of more than one different type of tire.

The hold down bar 43 is provided with a flared end 43A adapted to rest on the template and hold it against carrier plate 35. The other end of hold down bar 43 rests on a bushing 47 provided around pin 46 and which is of substantially the same height as the template. Hold down bar 43 is pressed down on the template by a hand nut 48 screwed onto pin 45. It is to be noted that slit 44 is of sufficient length to permit sufficient sliding of hold down bar away from the template 31 to disengage said template. Thus, by simply loosening the hand nut 48 and sliding back the hold down bar 43, the template 31 can be lifted off of the carrier plate 35 and can be exchanged for another template which is affixed by repeating the above steps in an inverse order. No tools such as wrenches, screwdrivers, etc. are required and the operation can be completed in as little as 10 seconds or less.

Referring to FIGS. 1–3, the upright member 14 is capped by a way structure 49 which forms a slide guide for a carriage 50 to permit movement of carriage 50 in a plane substantially parallel to base 10. Simultaneously, carriage 50 oscillates, together with member 14 and foot portion 13, around king pin 12. Carriage 50 is provided with bearing means 51 and a mandrel shaft 52 located therein, extending laterally of the carriage and having an axis of rotation substantially parallel to base 10. Mandrel shaft 52 is driven by a motor 53 through gear means 54, both mounted on carriage 50, and is designed to support a mandrel to hold a tire 66 during the buffing operation. A suitable mandrel has been described in U.S. Pat. No. 3,310,081 of the same applicant. Basically, the mandrel comprises a drum on which the deflated tire is mounted, means to fix and seal the tire with relation to the drum, and means to inflate said tire. Any suitable mandrel can be employed.

Adjustability between the way structure 49 and the carriage 50 is provided by a hand wheel 55 mounted on a shaft 56 which, in turn, is transversely mounted on carriage 50. A pinion gear 57 is keyed to shaft 56 and engages a rack 58, secured to way structure 49. The pinion gear 57 is rotatable in response to the turning of wheel 55, resulting in a back and forth movement of carriage 50 in relation to way structure 49 and upright member 14.

A feature of substantial importance in the machine of this invention is a measuring means to continuously and directly indicate the diameter of the tire and the progressing depth of the buffing operation. It comprises a scale 59 secured to the way structure 49 and parallel to rack 58, and a pointer 60 responsive to the movement of carriage 50. The scale 59 can be conveniently calibrated in a ratio of 1:2, so that a depth of cut can be read in terms of reduction of tire diameter.

As it will become apparent later on, the position of the pointer 60 with respect to carriage 50 is related to the circular cross-sectional diameter specification of the particular tire being buffed and thus depends upon the particular template being used. Therefore, the pointer 60 is slidably mounted on a gauge 61 fixed to the carriage 50 and is provided with numbers corresponding to the code numbers of each different template designating the tire cross-sectional diameter specification. Thus, when the template has been changed, the pointer has to be moved on gauge 61 to the number corresponding to the number on the new template, and, when the rasp is touching the tire, the reading on scale 59 will automatically show the true diameters of the tire prior to buffing, after buffing and at a given stage in buffing. The initial reading of tire diameter prior to buffing will be helpful to the operator in deciding whether to make a single cut across the tire or more than one.

The second and other major portion of the machine is mounted on base 10 in spaced relation with the tire support means 11. This portion includes a way means 62 fixedly mounted on base 10 and defining two slideways 63, 64. A rasp motor carriage 65 is slidably mounted on said slideways for movement in a plane substantially parallel to said base towards the tire 66 mounted on mandrel shaft 52. Appropriate bearing surfaces are provided on those under surfaces of carriage 65 and upper surfaces of way means 62 that contact each other to reduce friction. Also, suitable means for supplying lubricant to these contacting surfaces can be provided. Also, gibs 63A are mounted between carriage 65 and the side of each slideway 63, 64. The gibs 63A are adjustable towards said slideways by means of set screws mounted in holes 65B provided in the sides of carriage 65 to enhance smooth sliding and minimize sidewise movement of the carriage. A motor 67 and a cutting means, such as a cylindrical rasp 68, are mounted on carriage 65. The axis of rotation of the rasp 68 is substantially parallel to base 10 and, with the axis of rotation of the mandrel shaft 52, defines a plane parallel to base 10, as can be best appreciated in FIG. 2.

It has been found that in order to reduce the vibrations of the rasp 68 and the tire 66 to a minimum, the rasp is preferably of the cylindrical type, mounted horizontally to engage the tire which is rotating on a horizontal axis and, thus, buffs the tire circumferentially. An arrangement of this type eliminates the side thrust or yield of the tire to the rasp to eliminate vibrations and produce a more accurate buff. In addition, the design and construction of the way means 62 and the rasp motor carriage 65 is also directed to reduce the vibrations originated by the contact of rasp 68 with the tire surface.

Figure 7:
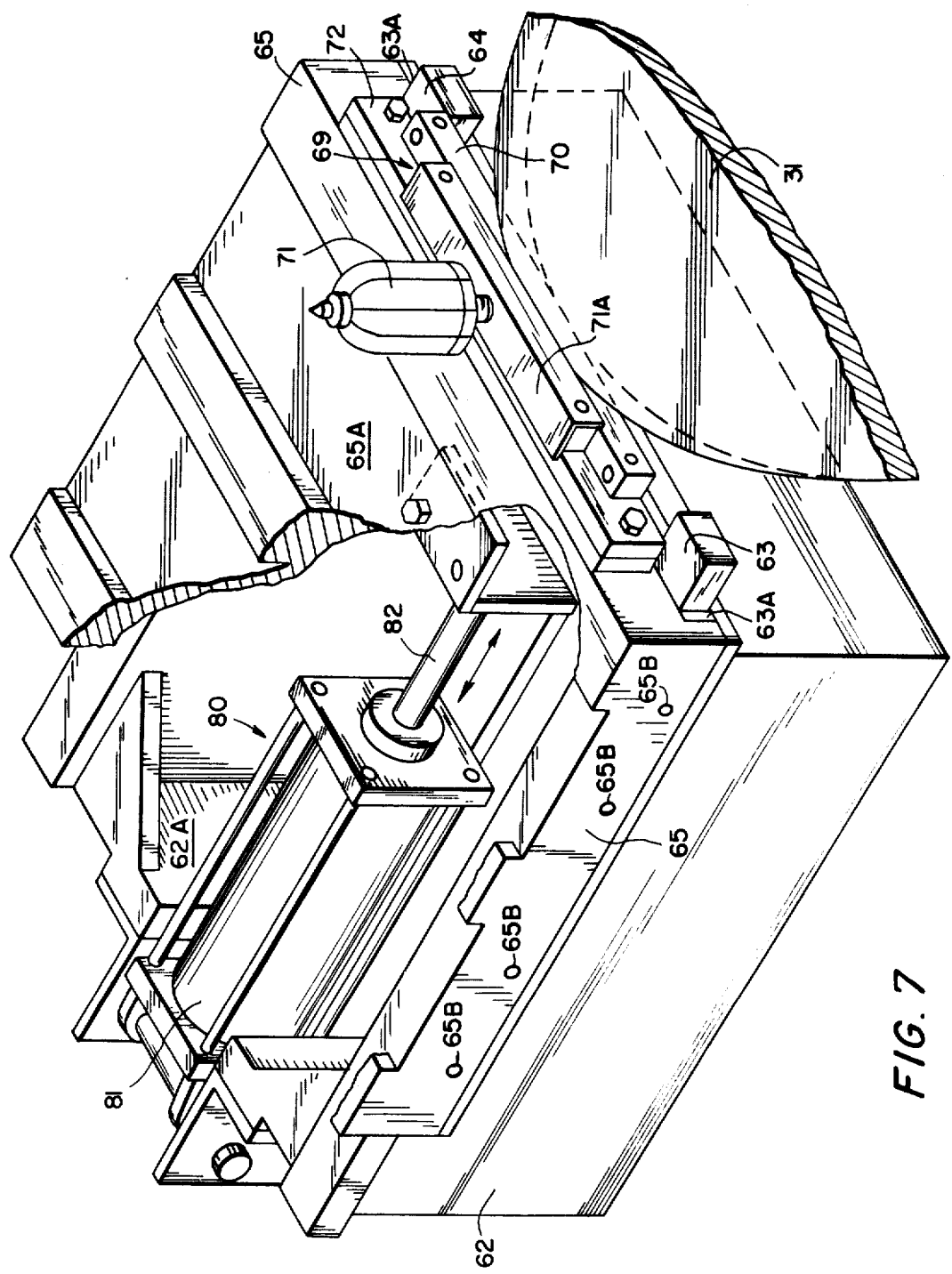
FIG. 7 is a perspective view, partially broken away, of the slide means provided with the follower means.

The sliding rasp motor carriage 65 is provided with a template follower means 69, better shown in FIG. 7, which is connected to said carriage for movement therewith towards contact with the profile of template 31.

It has been found that to buff all tires to the standard specifications required by the mold manufacturers for each tire, due to the many different tire sizes, crown widths, crown radii, shoulder radii, and overall buffs, it is not only necessary to use a different template for each kind of tire, said template having a 1:1 ratio with respect to the desired tire contour, if accurate results are to be obtained, but that the template follower means also must correspond in shape with the cutting means. In addition, for accurate results, the template contacting face of the template follower means 69 must define, together with the operative portion of said cutting means contacting the periphery of the tire, a plane which is parallel to the common axis of oscillation of the template and the tire at all positions of oscillation. Otherwise, time-consuming, complicated settings and adjustments are necessary during the buffing operation.

Therefore, according to the present invention, the template follower means 69 comprises a follow bar 70 fixedly secured to carriage 65 which, in the operative position of the machine, contacts the profile of template 31 which slides over said follow bar in the course of the oscillating movement of the template. To reduce the friction between the template 31 and the follow bar 70, a lubricating means such as an automatic oiler 71 and oiler cover 71A may be mounted on the carriage 65 to supply the follow bar 70 with a lubricant, which reduces the wear of template 31. Also, template 31 and/or follow bar 70 may consist of a wear-resistant, low-friction material such as Teflon. One or more spacing bars or shims 72 may be arranged between carriage 65 and follow bar 70 to provide an exact alignment of follow bar 70 under the operative portion of rasp 68, as mentioned before and as shown in FIGS. 1 and 7.

Figure 8:
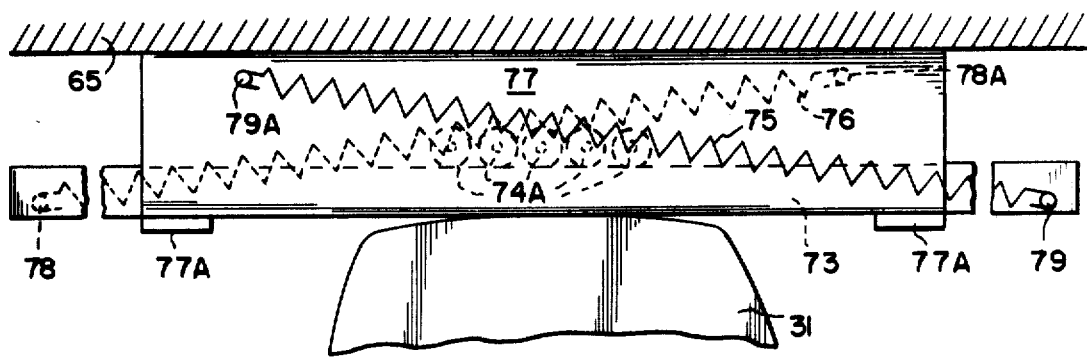
FIG. 8 is an elevational view of a second embodiment of the follower means.
Figure 9:
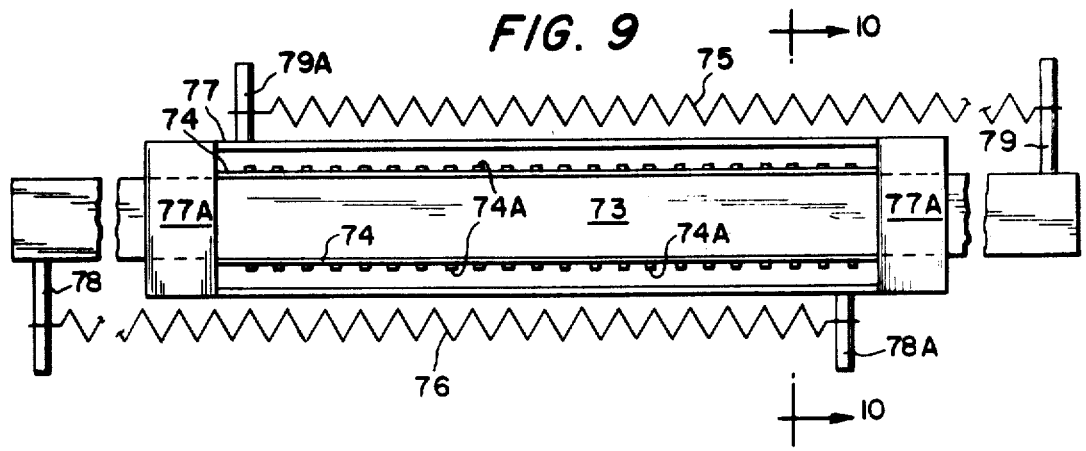
FIG. 9 is a plan view of the follower means shown in FIG. 8.
Figure 10:
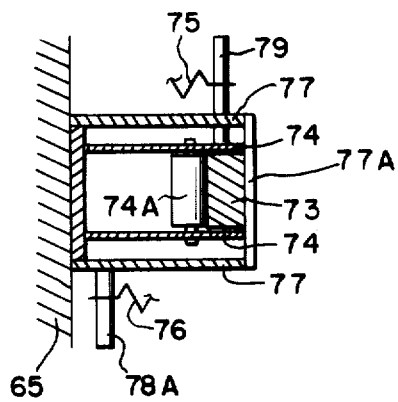
FIG. 10 is a section on line 10—10 of FIG. 9.

Another embodiment of the template follower means is shown in FIGS. 8, 9 and 10. In this embodiment, a follow bar 73 is attached to carriage 65 and in rolling relationship with template 31, so that substantially no frictional movement occurs between the follow bar and the template, and wear on both parts is practically eliminated. A rack 74 of roller bearings 74A is mounted on brackets 77 which are secured to the carriage 65, and the follow bar 73 is mounted on said brackets for sliding movement in the direction of its longitudinal axis. Face plates 77A mounted on brackets 77 guide the follow bar 73 in its longitudinal movement. The follow bar 73 is urged against said roller bearings 74A and towards the central position of the follow bar by means of two springs 75 and 76, each of them being affixed at respective pins 78 and 79, one at each end of follow bar 73 and at pins 78A and 79A located at the diagonally opposite ends of bearing support 77. In this arrangement, the follow bar 73 is free to move on its longitudinal axis on roller bearings 74A against the bias of one or the other or springs 75 and 76.

In order to continuously urge the template follower means 69 into contact with said template 31, and to simultaneously urge rasp 68 towards contact with the periphery of said tire 66, a double-action pneumatic cylinder 80 is located between way means 62 and rasp motor carriage 65. As it can be appreciated in FIG. 7, the cylinder housing 81 is affixed to the rear wall 62A of the way means 62 and the piston rod 82 is affixed to the base 65A of carriage 65. An air cylinder control valve 83 can be mounted on the carriage or can be located at any other convenient location to operate said pneumatic cylinder 80. Thus, the cylinder 80 is operated either to move the follow bar 70 back and off the template 31 when the template is to be changed, or to urge the follow bar 70 against the template 31 in the operative position of the machine.

Figure 6:
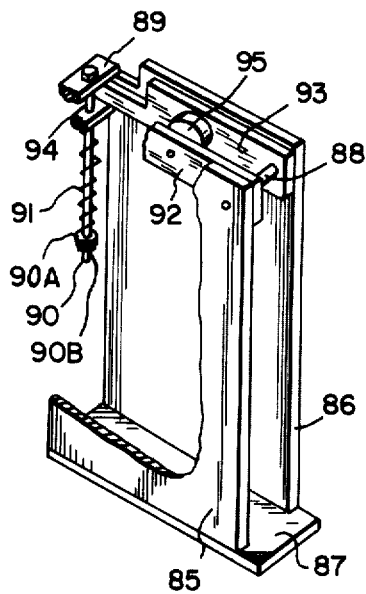
FIG. 6 is a broken perspective view of a spring-loaded bearing means used in supporting the slide means.

In addition to the slideways 63 and 64 to support and guide the rasp motor carriage 65, there is provided a spring-loaded bearing means 84, shown in detail in FIG. 6, mounted on base 10 on one or both sides of carriage 65 and way means 62 to support part of the weight of the rasp motor carriage 65. The bearing means 84 comprises two parallel frame plates 85 and 86 welded in spaced relationship to a base plate 87 which is affixed to the base 10. At the upper free end of the frame plates 85, 86 and near to one of their opposed corners a hinge pin 88 is mounted between said frame plates. At the other opposed corners of the upper free ends, the two frame plates are connected by a strut 89 carrying a bolt 90 provided with a spring 91. A rigid member comprising two spaced spars 92 and 93 is pivotally mounted at one end on the hinge pin 88 and the other ends of spars 92 and 93 rest on thrust washer 94 slidably mounted on said bolt 90 above said spring 91. The lower end of the spring 91 is supported by a washer 90A and a nut 90B threaded onto the lower end of the bolt 90. Thus, the ends of spars 92, 93 resting on thrust washer 94 are urged upwardly by spring 91 and the force of this upward urging can be regulated by moving the nut 90B upwardly or downwardly on bolt 90. A bearing roller 95 is rotatably mounted at an intermediate point between spars 92 and 93 and is adapted to contact a rail 96 mounted on the under surface of carriage 65.

The upward pressure exerted by the spring on the roller 95 supports a part of the weight of carriage 65 and thus reduces the frictional forces resisting the sliding of carriage 65 on way means 62 thus reducing the wear of the contacting surfaces of the carriage and way means as well as the template 31 and follow bar 70. The upward pressure can be adjusted by tightening or loosening nut 90B on bolt 90 as explained hereinabove.

The control means to operate the different motors are assembled on a control panel 97 mounted on carriage 50 and include a switch 98 for the rasp motor 67, a switch 99 for the tire motor 53, a reversing switch 100 for the sprocket motor 26 and a potentiometer 101 to regulate the speed of said sprocket motor 26.

As additional features, the buffing machine of this invention is also provided with a hood 102 partially surrounding said rasp 68 communicating with a dust conduit 103 which can be connected to a suction means (not shown) to collect the dust produced during the buffing operation. The hood 102 can be formed with a scoop 102A below the rasp 68 to catch heavier particles of dust.

An air conduit 104 including a pressure regulator 105 is mounted on the base 10 of the machine and connects to the mandrel mounted on the mandrel shaft 52 to supply pressurized air required to inflate a tire 66 and maintain it under relatively constant inflation pressure during buffing. A suitable arrangement for supplying inflating air to the tire is described in U.S. Pat. No. 3,310,081, although any suitable arrangement can be used. The control valve for turning the inflating air on and off and a pressure gauge measuring the air pressure supplied to the tire are conveniently mounted on, alongside or under control panel 97.

In the use of the buffing machine according to this invention, a tire of any desired size is mounted in a conventional manner around mandrel shaft 52 by means of a mandrel such as that shown in U.S. Pat. No. 3,310,081. Previous to this operation, the carriage 50 is moved in a direction away from the rasp 68, by rotating the operating wheel 55, in order to provide enough free space to mount the tire 66. Once the tire is mounted on the mandrel and it has been inflated by operating a valve means (not shown) on the control panel 97 controlling the supply of pressurized air through conduct 104, the proper template is selected which corresponds to the specifications required for the buffed contour of tire 66. A ratio of one to one is established between the template and the buffed tire contour when the buffing operation is finished.

The pointer 60 on carriage 50 is adjusted on gauge 61 to correspond with the code number indicated on the template designating the radius of the template corresponding to the tire to be buffed. This setting has to be made to compensate for the various sizes and types of tires and the corresponding various template radii and shapes of templates which, once mounted, determines the position of the follow bar 70 and, consequently of the rasp 68 in respect to the tire periphery. Since the scale 59 indicates the diameter of the particular mounted tire 66 when the tire periphery is brought into contact with the rasp, this simple setting of the pointer 60 will automatically compensate for the variation of the position of the rasp with respect to the axis of oscillation due to the variations in magnitude of template radii from template to template and will indicate the accurate diameter value of the tire 66 on scale 59. For example, a template for an 8.00 tire would hold the follow bar and rasp further away from the axis of oscillation than a template for a 7.00 or 6.50 tire and the pointer would be moved further away from carriage 50 on gauge 61 in order to provide an accurate diameter reading.

To mount the selected template on the machine, the air cylinder control valve 83 is operated to cause the double-action pneumatic cylinder 80 to urge the rasp motor carriage 65 and, consequently, the follow bar 70, away from the template assembly 30, thus releasing the template 31 from any pressure exerted by the follow bar. By loosening the hand nut 48 by hand the hold down bar can be slid back and out of contact with template 31. The template can now simply be lifted off, and a new selected template is put on plate 35 so that is abuts the alignment bar 41 and its recesses 42 engage with the protrusions 40. Subsequently, the hold down bar is slid forward into contact with the new template and the hand nut 48 is tightened by hand. Thereafter, the valve 83 is again operated to cause the double-action pneumatic cylinder 80 to urge the follow bar 70 back into contact with the new template 31. The whole process of exchange of templates does not require more than about 10 seconds and can be achieved without any need for tools.

As mentioned before, the template 31 abuts the alignment bar 41 to be accurately positioned with respect to the tire 66. This requirement that the positioning edge of said alignment bar 41 be exactly parallel to the axis of the mandrel shaft 52. This operation of aligning the bar 41, which has only to be carried out once when the buffing machine is installed, is accomplished by loosening bolts 38, adjusting the position of plate 35 around said pin 12A by means of said set screws 34 and again tightening said bolts 38.

The carriage 50 provided with the tire 66 to be buffed is moved towards the rasp 68 by turning the hand wheel 55 until the tire periphery abuts the rasp 68, at which point the pointer 60 will indicate the diameter of the unbuffed tire on scale 59. As it can be appreciated in FIGS. 2 and 3, a line drawn through the contact point of tire 66 and rasp 68 and the contact point of template 31 and follow bar 70 is substantially parallel to the axis of oscillation through king pin 12. In this position, the buffing operation can be started, although the angular position of the tire support means 11 with respect to the rasp 68 when buffing is begun is optional.

The tire drive motor 53 is started by actuating switch 99, the rasp motor 67 is started by actuating switch 98 and the wheel 55 is rotated to move the tire 66 into contact with the rasp 68, until the desired diameter is attained, which value will be indicated by pointer 60 on scale 59.

The cross-feed of the tire 66 to the rasp 68 is begun by starting sprocket motor 26 by actuating the reversing switch 100 in either direction, since with the machine of this invention climb cutting is avoided. If no adjustable limit switches are mounted on way ring 17, the desired amount of oscillation of the tire 66 with respect to rasp 68, that is the desired overall buffing width, can be controlled manually by reversing switch 100, thus oscillating the tire in the reverse direction until the desired width of buffing is attained. The buffed contour may both include the crown region and the sidewall portions of tire 66, since the tire support means 11 may basically oscillate within an angle of 180° or greater about the axis of oscillation. The speed of oscillation can be regulated by means of potentiometer 101.

The rate of cutting the tire surface can be regulated by regulating the speed of oscillation and the rate of cutting determines the texture of the buffed surface. The slower the speed of oscillation, the smoother the buff will be. The faster the speed of oscillation, the rougher the buff will be. The buffing operation is finished when the desired diameter is obtained and the rasp does not cut the tire any more. The contour of the tire now exactly corresponds to the profile of the template 31. If desired or necessary, the desired depth of cut can be obtained by making two or more cuts in the manner described above. The depth of cut is regulated by movement of carriage 50 towards rasp 68 by turning hand wheel 55. When the tire has cleared up and the proper diameter has been obtained, there is no necessity to recut the tire.

It is apparent that the operator has only to control the texture of the desired buffed surface, while the shaping process is carried out automatically and merely requires the insertion of the suitable template, which is a very easy and quick operation. The operator's work load is minimized through fewer machine adjustments in adapting the machine for different types of tires, thereby enabling the less buffing time per tire. Greater precision buffing is also achieved through the use of this invention.

It will be apparent that the described embodiment only has the purpose to illustrate the invention, while changes and variations may be made by those skilled in the art without departing from the scope of the invention which is defined in the appended claims.

What is claimed is:

1. A machine for buffing a tire comprising a base; tire support means pivotally mounted on said base to oscillate on an axis of oscillation substantially perpendicular to said base; rotating means for mounting and rotating said tire on an axis of rotation substantially parallel to said base, said rotating means being slidably mounted on said support means to oscillate therewith and to move in a plane substantially parallel to said base; template means mounted on said support means to oscillate therewith and with said rotating means, said template having a profile defining the contour desired for said tire; cutting means mounted on said base for movement in a plane substantially parallel to said base towards said tire mounted on said rotating means; template follower means connected to said cutting means for movement therewith into contact with the profile of said template; means for simultaneously urging said cutting means towards contact with the periphery of said tire and said follower into contact with the profile of said template means; and means for oscillating said support means to move the periphery of the tire across said cutting means, whereby the periphery of the tire is shaped into the desired contour according to the profile of said template.

2. A machine as defined in claim 1, wherein said rotating means includes a carriage slidably mounted on said support means for movement in a plane substantially parallel to said base towards and away from said cutting means, motor means mounted on said carriage to rotate said tire, driving means to move said carriage with respect to said support means, and measuring means to continuously and directly indicate the diameter and the buffing depth of the tire.

3. A machine as defined in claim 1, wherein said template means includes template carrier means fixedly secured to said tire support means, a template located on said template carrier means, and means to position said template and to secure it against movement with respect to the template carrier means.

4. A machine as defined in claim 1, wherein said cutting means comprises way means affixed to said base, slide means slidably mounted on said way means, and a power operated cylindrical rasp mounted on said slide means on an axis of rotation substantially parallel to said base.

5. A machine as defined in claim 1, wherein said means for oscillating comprises a way ring mounted on said base concentrically with said axis of oscillation, said tire support means being provided with stabilizing means slidable over said way ring.

6. A machine as defined in claim 5, wherein said way ring is provided with a peripheral groove and a roller chain, and said tire support means is provided with a sprocket means, said chain being attached at its two ends to said way ring and engaging with said sprocket means, the portions of the chain not in engagement with said sprocket means being located inside said groove, and said sprocket means comprising two idling sprockets and one driven sprocket located in between and operated by a reversible motor means, said chain surrounding a portion of said driven sprocket and being urged into this position by said idling sprockets.

7. A machine as defined in claim 2, wherein said driving means comprises rack gear means stationarily mounted on said support means, operating means, and pinion gear means transversely arranged on said carriage, said pinion gear means engaging with said rack gear means and being rotatable in response to the actuation of said operating means.

8. A machine as defined in claim 2, wherein said measuring means comprises a scale fixed to said support means and parallel to said rack gear means, a gauge affixed to said carriage and parallel to said scale, and a pointer means slidable along said gauge, said scale being calibrated to a ratio of 1:2 to directly indicate the diameter value of the tire being buffed, and said gauge including numbers corresponding to code numbers on the template designating the desired diameter of the buffed tire.

9. A machine as defined in claim 3, wherein said template carrier means comprises a first plate means attached to the tire support means and a second plate means mounted around said axis of oscillation and affixed to said first plate means, said first plate means being provided with two set screws to adjust the position of said second plate means around said axis of oscillation, said second plate means being provided with protrusions on its upper surface, and said template being mounted on said second plate means and being provided with recesses to engage with said protrusions.

10. A machine as defined in claim 9, wherein said means to secure the template against movement includes a hold down bar provided with a longitudinal slit and a nut to fix the bar to said second plate means and to press down said bar against said template.

11. A machine as defined in claim 4, wherein said way means includes a spring-loaded bearing means comprising a frame affixed to said base, a rigid member at one end hingedly mounted to said frame and at the other end suspended on spring means from said frame, and a roller means rotatably mounted on said member to contact said slide means.

12. A machine as defined in claim 4, wherein said template follower means is fixedly secured to said slide means and defines, together with the operative portion of said rasp contacting the periphery of said tire, a plane parallel to said axis of oscillation.

13. A machine as defined in claim 12, wherein said follower means comprises a follow bar fixedly secured to said slide means and in slidable relationship with said template, and lubricating means associated with said follow bar.

14. A machine as defined in claim 12, wherein said follower means comprises a follow bar slidably secured to said slide means and in rolling relationship with said template, roller bearing means rotatably mounted on said slide means to engage with said follow bar, and spring means to urge said follow bar towards its center position.

15. A machine as defined in claim 12, wherein said means to urge said follower means into contact with said template means includes pneumatic cylinder means located between said way means and said slide means, and air control valve means to operate said cylinder means.

* * * * *